United States Patent
Villien

(10) Patent No.: US 11,585,950 B2
(45) Date of Patent: Feb. 21, 2023

(54) METHOD FOR IDENTIFYING A STATIC PHASE OF A VEHICLE

(71) Applicant: Commissariat à l'Energie Atomique et aux Energies Alternatives, Paris (FR)

(72) Inventor: Christophe Villien, Grenoble (FR)

(73) Assignee: Commissariat a l'Energie Atomique et aux Energies Alternatives, Paris (FR)

(*) Notice: Subject to any disclaimer, the term of this patent is extended or adjusted under 35 U.S.C. 154(b) by 51 days.

(21) Appl. No.: 17/230,307

(22) Filed: Apr. 14, 2021

(65) Prior Publication Data
US 2021/0318452 A1  Oct. 14, 2021

(30) Foreign Application Priority Data
Apr. 14, 2020  (FR) ...................................... 20 03734

(51) Int. Cl.
*G01S 19/49*  (2010.01)
*G01S 19/52*  (2010.01)

(52) U.S. Cl.
CPC .............. *G01S 19/49* (2013.01); *G01S 19/52* (2013.01)

(58) Field of Classification Search
CPC .................................. G01S 19/49; G01S 19/52
USPC ..................................................... 342/357.32
See application file for complete search history.

(56) References Cited

U.S. PATENT DOCUMENTS

| 5,991,692 A | 11/1999 | Spencer, II et al. |
| 11,441,907 B2 * | 9/2022 | Ishigami .............. G01C 21/188 |
| 2008/0234933 A1 | 9/2008 | Chowdhary et al. |
| 2009/0319228 A1 * | 12/2009 | Niu ....................... G01C 25/005 702/182 |
| 2018/0108150 A1 * | 4/2018 | Curtis .................. H04N 13/246 |

FOREIGN PATENT DOCUMENTS

| EP | 0 870 175 A2 | 10/1998 |
| FR | 2957752 A1 * | 9/2011 ........... A01K 11/008 |
| JP | 2006068300 A * | 3/2006 |
| WO | WO 97/24584 A1 | 7/1997 |

OTHER PUBLICATIONS

French Preliminary Search Report dated Dec. 21, 2020 in French Application 20 03734 filed on Apr. 14, 2020, 11 pages (with English Translation of Categories of Cited Documents & Written Opinion).
Godha, "Performance Evaluation of Low Cost MEMS-Based IMU Integrated With GPS for Land Vehicle Navigation Application", Geomatics Engineering, UCGE Reports No. 20239, Feb. 2006, 230 pages.

* cited by examiner

*Primary Examiner* — Harry K Liu
(74) *Attorney, Agent, or Firm* — Oblon, McClelland, Maier & Neustadt, L.L.P.

(57) ABSTRACT

A method for identifying a static phase of a vehicle involves a first step of detecting the static phase without using measurements of a satellite geolocation unit, this first detection step involving checking that a first set of one or more conditions is satisfied, checking, repeatedly, that a second set of one or more conditions is satisfied, then so long as the second set of conditions is satisfied, executing a second step of detecting the static phase from the measurements of the satellite geolocation unit, so long as the second set of conditions is not satisfied, executing the first detection step and inhibiting the execution of the second detection step.

13 Claims, 2 Drawing Sheets ably transmit signals. For vehicles traveling on Earth's surface, the computer 20 comprises a programmable electronic computer 20. This computer 20 is capable of acquiring the measurements of the units 10 and 12 and, from these measurements, of determining the position and orientation of the vehicle 2 in the reference frame $R_T$. The computer 20 comprises a microprocessor 22 and a memory 24 comprising the instructions and the data necessary for implementing the method described with reference to FIG. 2 or 3.

METHOD FOR IDENTIFYING A STATIC PHASE OF A VEHICLE

The invention relates to a method for identifying a static phase of a vehicle in which the vehicle is immobile in a reference frame integral with the earth. The invention also relates to an information recording medium, a module for identifying a static phase and a locating system for implementing this method.

A static phase of a vehicle is a phase during which the vehicle is immobile with respect to the surface of the earth.

Determining a static phase of the vehicle is important because, in a static phase, the measurements of some sensors of the vehicle allow initialization of a certain number of parameters of the vehicle that can be initialized correctly only when the vehicle is immobile.

For example, the application U.S. Pat. No. 5,991,692A or EP0870175 describes a known method for identifying a static phase of a vehicle. In this application, a static phase of the vehicle is identified by comparing the measurements of an accelerometer and a gyrometer aboard the vehicle with predetermined thresholds. The velocity and the position of the vehicle, which are obtained from the measurements of a satellite geolocation unit, are not used. This is because these measures are not always available. This is the case, for example, if the vehicle is in surroundings that prevent the satellite geolocation unit from receiving satellite signals. Similarly, the application US2008234933 discloses systematically beginning by detecting a static phase from the measurements of an accelerometer and a gyrometer and then, in some cases, confirming this detection from the measurements of the geolocation unit.

The aim of the invention is to improve the reliability of the known methods for identifying a static phase of a vehicle. To this end, the subject of the invention is a method for identifying a static phase of a vehicle.

The subject of the invention is also an information recording medium, readable by a microprocessor, comprising instructions for performing the above identification method, when these instructions are executed by a microprocessor.

The subject of the invention is also a module for identifying a static phase of a vehicle for implementing the above method.

Finally, the subject of the invention is also a locating system comprising the above detection module.

The invention will be better understood on reading the description that follows, which is given solely by way of nonlimiting example and provided with reference to the drawings, in which.

In these figures, the same references are used to denote the same elements.

In the remainder of this description, features and functions that are well known to a person skilled in the art are not described in detail. For example, a presentation of the prior art on the subject can be found in the following thesis: S. Godha, *"Performance Evaluation of Low Cost MEMS-Based IMU Integrated With GPS for Land Vehicle Navigation Application"*, PhD report, 2006. This thesis is denoted by the expression "Godha2006" below.

In this description, detailed examples of embodiments are first described in chapter I with reference to the figures. Then, in chapter II that follows, variants of these embodiments are presented. Finally, the advantages of the various embodiments are presented in a chapter III.

Chapter I: Examples of Embodiments

Figure 1:
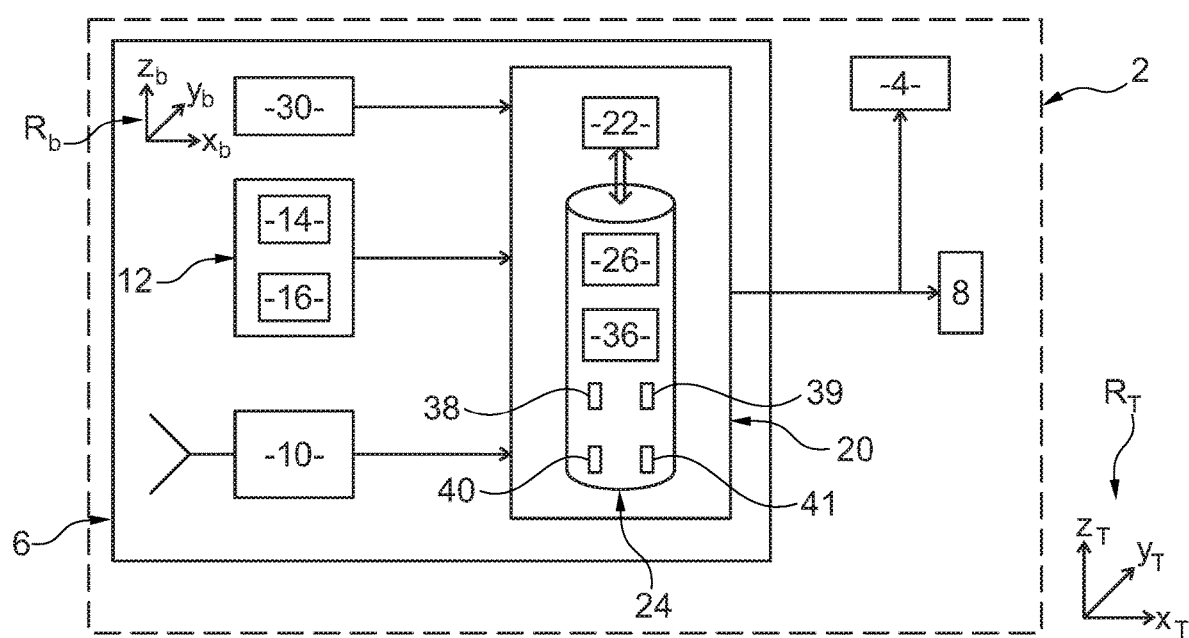
FIG. 1 is a schematic illustration of a system for locating a vehicle.

FIG. 1 shows a motor vehicle 2 capable of moving on the earth. The vehicle 2 is equipped with propulsion means 4. In the case of a motor vehicle, the means 4 are usually an internal combustion engine or a hybrid engine or an electric motor. When the vehicle 2 is at a standstill, it is subject to vibrations and notably to vibrations of the propulsion means 4 when the latter are not switched off.

The vehicle 2 is equipped with a system 6 for locating this vehicle. This system 6 is capable of determining the position and orientation of the vehicle 2 in a terrestrial reference frame $R_T$. The terrestrial reference frame $R_T$ is fixed to the earth without any degree of freedom. The reference frame $R_T$ comprises three axes that are typically orthogonal with respect to one another. A moving reference frame $R_b$ is also fixed to the vehicle 2 without any degree of freedom. This reference frame $R_b$ comprises three axes that are orthogonal with respect to one another, denoted $x_b$, $y_b$ and $z_b$, respectively. Conventionally, when the vehicle 2 moves horizontally, the axes $x_b$ and $y_b$ are in a horizontal plane and the axis $z_b$ is vertical.

Here, the position of the vehicle 2 in the reference frame $R_T$ is expressed by the latitude L, the longitude $\lambda$ and the altitude h of the origin of the reference frame $R_b$.

The orientation of the vehicle 2 is expressed by the yaw angle $\psi$, the pitch angle $\theta$ and the roll angle $\phi$ of the reference frame $R_b$ with respect to the reference frame $R_T$.

The position and orientation determined by the system 6 are usually transmitted to a cockpit 8 for guiding or helping to guide the vehicle 2 to a predefined destination. The cockpit 8 can be a manual and/or automatic cockpit. In the case of a manual cockpit, the determined position and orientation are transmitted to a human-machine interface for helping a human being to control the propulsion means 4. In the case of an automatic cockpit, the determined position and orientation are automatically converted into commands for controlling the propulsion means 4 and are then automatically transmitted to these propulsion means 4.

The system 6 comprises a satellite geolocation unit 10 and an inertial navigation unit 12. The unit 10 is known by the acronym GNSS ("Global Navigation Satellite System"). The unit 10 is, for example, a mono-antenna geolocation unit rather than a multi-antenna geolocation unit. The unit 10 is therefore incapable of measuring the absolute orientation of the vehicle 2 in the reference frame $R_T$ from the satellite signals transmitted by the satellites.

The unit 12 is known by the acronym IMU ("Inertial Measurement Unit"). The unit 12 notably comprises a triaxial accelerometer 14 and a triaxial gyrometer 16. Courtesy of these sensors, the unit 12 is capable of measuring the variation in the orientation of the vehicle 2. On the other hand, the unit 12 is itself also incapable of directly measuring the orientation of the vehicle 2 in the reference frame $R_T$.

In order to determine the position and orientation of the vehicle 2 from the measurements of the units 10 and 12, the system 6 comprises a programmable electronic computer 20. This computer 20 is capable of acquiring the measurements of the units 10 and 12 and, from these measurements, of determining the position and orientation of the vehicle 2 in the reference frame $R_T$. The computer 20 comprises a microprocessor 22 and a memory 24 comprising the instructions and the data necessary for implementing the method described with reference to FIG. 2 or 3.

More precisely, the memory 24 comprises the instructions of a module 26. The module 26 notably executes a fusion algorithm capable of establishing, from a previous assessment of the position and orientation of the vehicle 2 and new measurements of the units 10 and 12 acquired since this previous assessment, a new assessment of the position and orientation of the vehicle 2. For each new assessment of the position and orientation of the vehicle 2, the fusion algorithm also establishes a margin of error for this assessment.

Fusion algorithms are well known to a person skilled in the art. For example, the interested reader may once again refer to the Godha2006 thesis mentioned earlier. The fusion algorithm fuses the measurements of the units 10 and 12 in order to obtain more precise assessments of the position and orientation of the vehicle 2 than if, for example, just the measurements of the unit 10 were used to determine the position and just the measurements of the unit 12 were used to determine the orientation of the vehicle 2. In other words, in order to establish each of the assessments of the position and orientation of the vehicle 2, the module 26 uses the measurements both of the unit 10 and of the unit 12. For example, this fusion algorithm implements one or more Kalman filters.

It is necessary to initialize the fusion algorithm with initial assessments of the position and orientation of the vehicle 2. These initial assessments are made, for example, as described in the book: Paul D. Groves: "*Principles of GNSS, Inertial, and Multisensor Integrated Navigation Systems*", Second Edition (GNSS Technology and Applications), Artech House, 2008. Here, the initial assessment of the yaw angle is obtained from the measurements of a magnetometer. To this end, the system 6 therefore moreover comprises a magnetometer 30 connected to the computer 20.

The magnetometer 30 is a triaxial magnetometer, that is to say that it comprises three non-colinear measurement axes, which are fixed in the reference frame $R_b$. Here, these three measurement axes are parallel to the three axes $x_b$, $y_b$ and $z_b$, respectively, of the reference frame $R_b$.

In the course of these movements, the vehicle 2 can be brought to a halt. It is then immobile in the reference frame $R_T$. The static phase is the interval of time during which the vehicle 2 remains immobile. Static phases are, for example, turned to good account for calibrating and initializing parameters of the vehicle 2. For example, the computer 6 here implements the calibration process known by the acronym ZVU (Zero Velocity Updates) and/or the calibration process known by the acronym ZARU (Zero Angular Rate Updates).

To identify static phases, the memory 24 comprises the instructions of a module 36 that is capable of identifying these static phases when these instructions are executed by the microprocessor 22. To this end, the memory 24 comprises, in particular, four sets 38 to 41 of conditions. Each set of conditions can comprise one or more conditions to be verified. In this embodiment, a set of conditions is considered to be satisfied if each of the conditions of this set is verified, that is to say that each of these conditions is true. Conversely, if one of the conditions of a set of conditions is false, then the set of conditions is not satisfied. Examples of these sets 38 to 41 are described in more detail with reference to FIGS. 2 and 3.

The operation of the system 6 will now be described with reference to the method of FIG. 2.

In a step 50, the computer 20 acquires the measurements of the unit 10, of the accelerometer 14, of the gyrometer 16 and of the magnetometer 30. More precisely, in this step 50, the computer 20 acquires the following measurements at an instant k:

the instantaneous velocity $v_i(k)$ of the vehicle, obtained solely from the measurements of the unit 10, the instantaneous position $P_i(k)$ of the vehicle 2, obtained solely from the measurements of the unit 10, the instantaneous acceleration $a_i(k)$ of the vehicle 2, obtained solely from the measurements of the accelerometer 14, the angular velocity $w_i(k)$ of the vehicle 2, obtained solely from the measurements of the gyrometer 16, the instantaneous earth's magnetic field $B_i(k)$ that the vehicle 2 is in, obtained solely from the measurements of the magnetometer 30, and the number $n_{SF}(k)$ of satellites visible by the unit 10, that is to say the number of satellites that transmit satellite signals used to obtain the measurements $P_i(k)$ and $v_i(k)$ to the unit 10.

Typically, the velocity $V_i(k)$ and the position $P_i(k)$ are each in the form of a vector comprising three coordinates along the axes $x_T$, $y_T$ and $z_T$, respectively, of the reference frame $R_T$. Here, the indices x, y and z are used to denote the coordinates along the axes $x_T$, $y_T$ and $z_T$, respectively, for an acquired measurement. Thus, for example, the symbol $v_{i,x}(k)$ denotes the coordinate along the axis $x_T$ for the measurement $v_i(k)$.

The acceleration $a_i(k)$, the angular velocity $w_i(k)$ and the magnetic field $B_i(k)$ are also each in the form of a vector comprising three coordinates along the measurement axes of the sensor that has taken these measurements. Here, these measurement axes are parallel to the axes $x_b$, $y_b$ and $z_b$ of the reference frame $R_b$.

Below, the symbol "G" is used to denote any one of the physical quantities measured in step 50. Thus, the physical quantity G belongs to the group made up of:

the velocity of the vehicle 2, obtained from the measurements of the unit 10, the position of the vehicle 2, obtained from the measurements of the unit 10, the acceleration of the vehicle 2, measured by the accelerometer 14, the angular velocity of the vehicle 2, measured by the gyrometer 16, and the magnetic field measured by the magnetometer 30.

In a step 52, the computer 20 calculates the values $I_G(k)$ of multiple indicators $I_G$ at the instant k. In this embodiment, each indicator $I_G$ represents a respective statistical moment for the measurements of the physical quantity G at the instant k. Each value $I_G(k)$ is calculated from the measurements of the physical quantity G taken during a sliding window W. The window W is a sliding window that extends from the current instant k to a previous instant $k-N_{WG}$, where $N_{WG}$ is a whole number of sampling periods $T_e$ that separates the instant k from the instant $k-N_{WG}$. In this first embodiment, the number $N_{WG}$ is the same for all the physical quantities G. Moreover, here, the number $N_{WG}$ is chosen so that the duration $D_G$ of the window W is less than or equal to five seconds or three seconds and greater than or equal to one second. For example, the number $N_{WG}$ is chosen so that the duration $D_G$ of this window W is equal to two seconds.

By way of illustration, below, only the following two indicators $I_G$ are used and calculated for each of the physical quantities G by the computer 20:

an indicator, denoted $\mu_G$, that is equal to the first-order ordinary moment, that is to say to the expectation or to the average of the measurements of the physical quantity G taken during the window W, an indicator, denoted $\sigma_G$, that is equal to the second-order central moment, that is to say the standard deviation of the measurements of the physical quantity G taken during the window W.

Steps 50 and 52 are executed at each instant k. Two immediately consecutive instants k are separated from one another by the sampling period $T_e$. For example, here, the sampling frequency is 200 Hz. In this case, the number $N_{WG}$ is equal to 400. Below, 1, 2, 3, . . . k–2, k–1, k are used to denote the succession of instants up to the current instant k. Thus, the instant k–1 is an instant that immediately precedes the instant k.

In parallel and after the values $I_G(k)$ have been calculated for each of the physical quantities G, in a step 60, the module 36 checks whether the quality of the satellite signals received by the unit 10 is considered good. The quality of the satellite signals is considered good if the set 38 of conditions is satisfied. In this embodiment, the set 38 comprises only the following two conditions:

$$\sigma_v(k) < S_{38.1}, \text{ and} \qquad \text{condition (38.1):}$$

$$n_{SV}(k) > S_{38.2}, \qquad \text{condition (38.2):}$$

where:
$\sigma_v(k)$ is the indicator representing the standard deviation of the measurements $v_i(k)$ of the velocity taken by the unit 10, and
$S_{38.1}$ and $S_{38.2}$ are constant predetermined thresholds.

The standard deviation $\sigma_v(k)$ for the measurement $v_i(k)$ is for example provided by the unit 10 at the same time as each velocity $v_i(k)$. Thus, the standard deviation $\sigma_v(k)$ is acquired by the computer 20 and not calculated during step 52.

For example, the threshold $S_{38.1}$ is less than 0.5 m/s or 0.1 m/s.

Typically, the threshold $S_{38.2}$ is a constant greater than or equal to three or four. However, other values are possible. For example, the threshold $S_{38.2}$ can also be chosen to be equal to one or two because the velocity $v_i(k)$ can remain good for a certain time even if the number $n_{SV}(k)$ is less than three, because this velocity $v_i(k)$ is usually obtained from the measurements of the unit 10 by using a Kalman filter. This makes it possible to compensate, at least temporarily, for the absence of reception of satellite signals from one or more satellites.

If, in step 60, the set 38 of conditions is not satisfied, then the method continues with a step 62 of detecting a static phase of the vehicle 2 without using the measurements of the unit 10.

In step 62, the module 36 checks whether the set 39 of conditions is satisfied. If so, it then proceeds to a step 64, in which the module 36 signals a static phase of the vehicle. For example, this is accomplished by virtue of the module 36 assigning the value "1" to a variable StaticFlag.

If the set 39 of conditions is not satisfied, the module 36 then proceeds to a step 66 in which it signals the absence of a static phase, that is to say movement of the vehicle 2. This is accomplished by virtue of the module 36 assigning the value "0" to the variable StaticFlag.

The set 39 is devoid of conditions that are dependent on the measurements of the unit 10. Here, the set 39 comprises only conditions that are dependent on the measurements of the accelerometer 14, of the gyrometer 16 and of the magnetometer 30. Moreover, to simplify the methods of FIGS. 2 and 3, the measurements of the magnetometer 30 are not used to identify a static phase of the vehicle.

The set 39 of conditions comprises only the following three conditions:

$$\sigma_a(k) < S_{39.1}, \qquad \text{condition (39.1):}$$

$$\sigma_w(k) < S_{39.2}, \text{ and} \qquad \text{condition (39.2):}$$

$$\mu_w(k) < S_{39.3}, \qquad \text{condition (39.3):}$$

where:
$\sigma_a(k)$ is the value, at the instant k, of the indicator $\sigma_a$ representing the standard deviation of the measurements of the acceleration of the vehicle 2 taken by the accelerometer 14,
$\sigma_w(k)$ is the value, at the instant k, of the $\sigma_a$ indicator a representing the standard deviation of the measurements of the angular velocity taken by the gyrometer 16,
$\mu_w(k)$ is the value, at the instant k, of the indicator $\mu_w$ representing the average of the measurements of the angular velocity taken by the gyrometer 16, and
$S_{39.1}$, $S_{39.2}$ and $S_{39.3}$ are predetermined thresholds as described later on.

The indicators $\sigma_a(k)$, $\sigma_w(k)$ and $\mu_w(k)$ are those calculated in step 52.

Here, the set 39 comprises no condition that is dependent on the indicator $\mu_a$, that is to say on an indicator representing the average of the measurements of the acceleration taken by the accelerometer 14.

Figure 2:
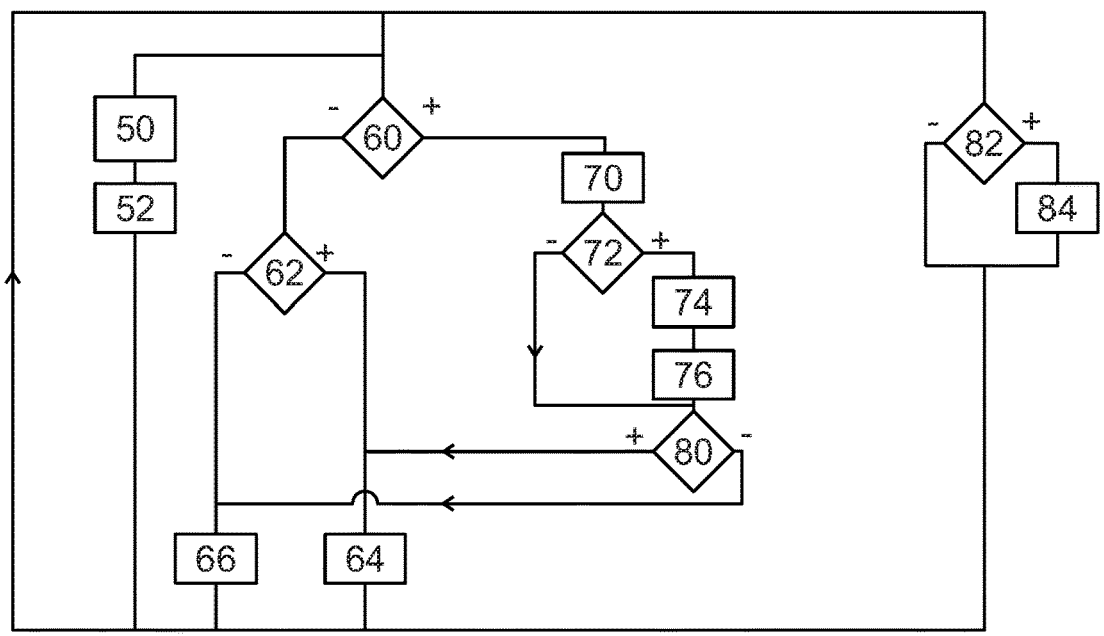
FIGS. 2 and 3 are flowcharts of a first and a second method, respectively, for identifying a static phase of a vehicle by using the system from FIG. 1.
Figure 3:
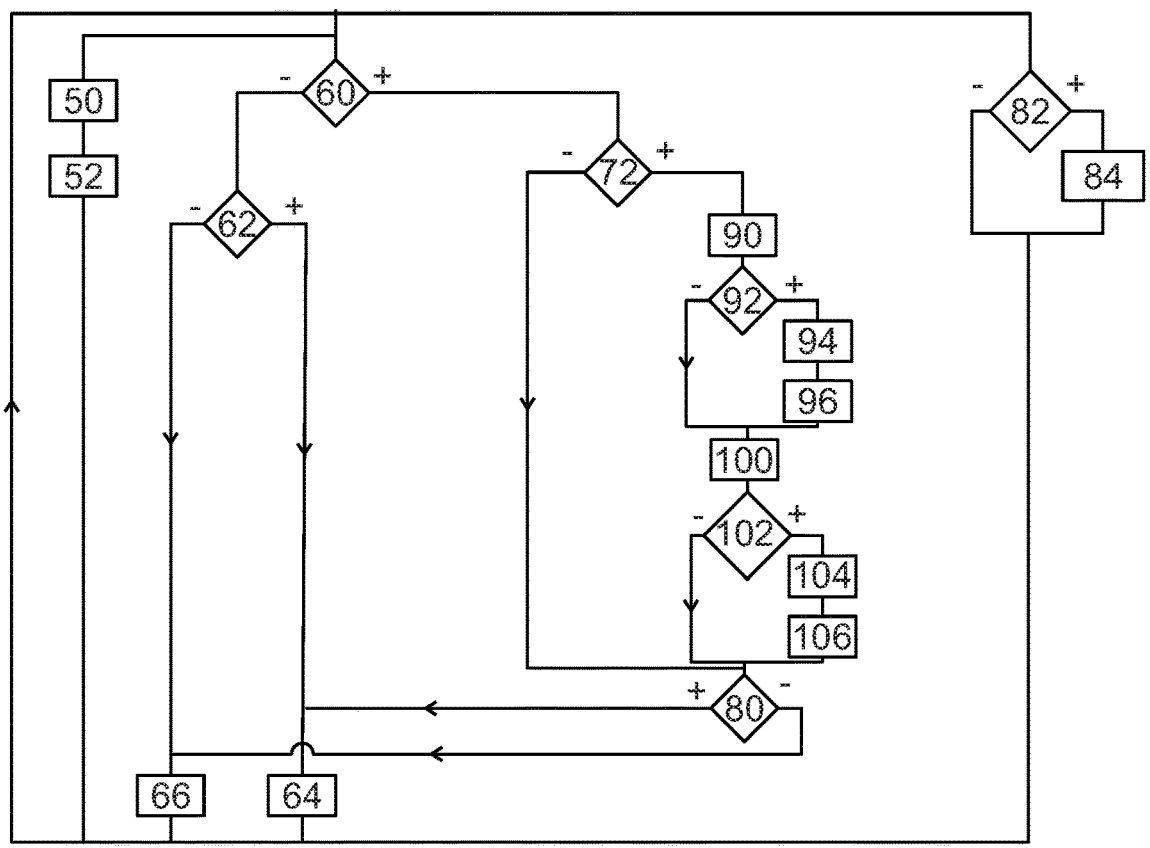

In the embodiments of FIGS. 2 and 3, the value $I_G(k)$ of an indicator $I_G$ is considered to be less than a threshold $S_G$ if the absolute value of each of its three coordinates $I_{Gx}$, $I_{Gy}$ and $I_{Gz}$ is less than this threshold $S_G$.

If, in step 60, the set 38 of conditions is satisfied, then the method continues with a step 70 of incrementing thresholds $S_{40.1}$ and $S_{40.2}$. The thresholds $S_{40.1}$ and $S_{40.2}$ are thresholds used in the set 40 of conditions.

The thresholds $S_{40.1}$ and $S_{40.2}$ are incremented on the basis of a duration $D_l$ that separates the current instant k from the last instant where a step of calibrating the thresholds of the set 39 was executed. Here, the thresholds $S_{40.1}$ and $S_{40.2}$ are incremented in a manner proportional to this duration $D_l$. For example, this is accomplished by virtue of the thresholds $S_{40.1}$ and $S_{40.2}$ being incremented using the following relationships:

$$S_{40.1} = \text{Min}[(1 + F_{40.1} \times D_l) \times S_{40.1-last}; S_{41.1}],$$

$$S_{40.2} = \text{Min}[(1 + F_{40.2} \times D_l) \times S_{40.2-last}; S_{41.2}]$$

where:
$F_{40.1}$ and $F_{40.2}$ are positive constants,
$S_{40.1-last}$ and $S_{40.2-last}$ are the values of the thresholds $S_{40.1}$ and $S_{40.2}$, respectively, obtained at the end of the previous execution of a step 74 described later on
Min[ . . . ;] is the function that returns the smallest of the terms between square parentheses,
the symbol "x" denotes the multiplication operation, and
$S_{41.1}$ and $S_{41.2}$ are thresholds used in the set 41 of conditions.

The constants $F_{40.1}$ and $F_{40.2}$ are chosen to be small so that the thresholds $S_{40.1}$ and $S_{40.2}$ do not increase too quickly. For example, this is accomplished by virtue of the constants $F_{40.1}$ and $F_{40.2}$ being chosen to be between 1/10 and 1/36000. Here, the constants $F_{40.1}$ and $F_{40.2}$ are equal to 1/3600.

Next, in a step 72, the module 36 checks whether the set 40 of conditions is satisfied. If the set 40 of conditions is satisfied, the module 36 then proceeds to execute a step 74 of calibrating the thresholds of the set 39. Otherwise, step 74 is not executed.

In this embodiment, the set 40 comprises only the following conditions:

$$\mu_v(k) < S_{40.1}, \text{ and} \qquad \text{condition (40.1):}$$

$$\sigma_v(k) < S_{40.2}, \qquad \text{condition (40.2):}$$

where:
- $\mu_v(k)$ is the value, at the instant k, of the indicator $\mu_v$ representing the average of the measurements $v_i(k)$ of the velocity of the vehicle 2,
- $\sigma_v(k)$ is the value, at the instant k, of the indicator $\sigma_v$ representing the standard deviation of the measurements $v_i(k)$ of the velocity of the vehicle 2,
- $S_{40.1}$ and $S_{40.2}$ are the thresholds incremented in step 70.

The thresholds $S_{40.1}$ and $S_{40.2}$ are low enough for the set 40 of conditions to be satisfied only when a static phase of the vehicle 2 is detected. To this end, here, the thresholds $S_{40.1}$ and $S_{40.2}$ are lower than the thresholds $S_{41.2}$ and $S_{41.1}$, respectively, of the set 41 of conditions.

In step 74, the thresholds $S_{39.1}$ to $S_{39.3}$ of the set 39 are calibrated on the basis of the characteristics of the noise on the measurements of the accelerometer 14 and of the gyrometer 16 taken during the static phase of the vehicle 2. To this end, the thresholds $S_{39.1}$ to $S_{39.3}$ are updated using the following relationships in step 74:

$$S_{39.1} = \sigma_a(k) \times F_{39.1},$$

$$S_{39.2} = v_w(k) \times F_{39.2}, \text{ and}$$

$$S_{39.3} = |\mu_w(k)| \times F_{39.3},$$

where $F_{39.1}$ to $F_{39.3}$ are constants greater than one and the symbol | ... | denotes the absolute value function.

The constants $F_{39.1}$ to $F_{39.3}$ are used to keep a sufficient margin of error with respect to the minimum values of the indicators $\sigma_a$, $\sigma_w$ and $\mu_w$ observed in a static phase of the vehicle 2. Typically, the constants $F_{39.1}$ to $F_{39.3}$ are greater than 1.3 or 1.5 and, usually, less than ten, five or three. Here, the constants $F_{39.1}$ to $F_{39.3}$ are all taken to be equal to two.

In the absence of noise external to the sensors, during the static phase of the vehicle 2, the values of the indicators $\sigma_a$, $\sigma_w$ and $\mu_w$ should all be equal to the natural noise of the sensors. "Natural noise of the sensor" denotes the noise observed on the measurement of a sensor in the absence of any external perturbation. The natural noise is caused by the components of the sensor. "External noise", on the other hand, denotes the noise caused by perturbations external to the sensor. Typically, here, the external noise is caused by the vibrations of the engine of the vehicle 2. Thus, during a static phase of the vehicle 2, the values $\sigma_a(k)$, $\sigma_w(k)$ and $\mu_w(k)$ represent the characteristics of the natural noise and, possibly, of a remainder of external noise that exists even during the static phase, these affecting the measurements of the accelerometer 14 and the gyrometer 16. Thus, the relationships above allow adjustment of the thresholds $S_{39.1}$ to $S_{39.3}$ on the basis of the natural noise and the possible remainder of external noise that are measured and observed on the measurements of the accelerometer 14 and the gyrometer 16.

Consequently, updating the thresholds $S_{39.1}$ to $S_{39.3}$ during a static phase of the vehicle 2 detected from the measurements of the unit 10 allows:
1) the risk of these thresholds being calibrated while the vehicle 2 is moving to be limited, and
2) the values of these thresholds to be automatically controlled on the basis of the characteristics of the natural noise and the possible remainder of the external noise that are measured, and therefore precise control of these thresholds to be obtained, which increases the reliability of the detection of a static phase when step 62 is next executed.

Increasing the reliability of the detection of a static phase involves:
- limiting the number of times a static phase is signaled while the vehicle 2 is still moving, and
- limiting the number of times the absence of a static phase is signaled while the vehicle 2 is immobile.

Next, in a step 76, the thresholds of the set 40 are decremented. This is accomplished, here, by virtue of the thresholds $S_{40.1}$ and $S_{40.2}$ being decremented using the following relationships: $S_{40.1} = \mu_V(k)$ and $S_{40.2} = \sigma_V(k)$, where the values $\mu_V(k)$ and $\sigma_V(k)$ are the same as those used in step 72.

If step 76 is executed, this means that the set 40 is satisfied and therefore that the values $\mu_V(k)$ and $\sigma_V(k)$ are lower, when step 72 is executed, than the thresholds $S_{40.1}$ and $S_{40.2}$, respectively. Thus, the two relationships above systematically result in the values of the thresholds $S_{40.1}$ and $S_{40.2}$ being decreased when they are executed. Under these conditions, the thresholds $S_{40.1}$ and $S_{40.2}$ converge on minimum values that are reached when the indicators $\mu_V$ and $\alpha_V$ take their minimum values during the static phase. This makes it possible to limit the number of times step 74 is executed during a static phase. This also makes it possible to execute step 74 only when the immobility of the vehicle 2 is still better than when step 74 was executed previously. Therefore, step 74 is executed only when the current situation of the vehicle makes it possible to obtain better control of the thresholds of the set 39 than the previous control.

After step 76, or directly after step 72 if the set 40 of conditions is not satisfied, a step 80 of detecting a static phase of the vehicle 2 from the measurements of the unit 10 is executed by the module 36. In this step, the module 36 checks whether the set 41 of conditions is satisfied. If so, the method continues with step 64. Otherwise, if the set 41 of conditions is not satisfied, the method continues with step 66.

In this embodiment, the set 41 of conditions comprises only the following conditions:

$$\sigma_V(k) < S_{41.1}, \text{ and} \qquad \text{condition (41.1):}$$

$$|\mu_V(k)| < S_{41.2}, \qquad \text{condition (41.2):}$$

where $S_{41.1}$ and $S_{41.2}$ are constant thresholds, for example.

For example, the thresholds $S_{41.1}$ and $S_{41.2}$ are higher than 0.03 m/s or than 0.05 m/s and usually lower than 0.5 m/s or 0.3 m/s. Here, the thresholds $S_{41.1}$ and $S_{41.2}$ are both equal to 0.1 m/s.

In parallel with the previous steps, in a step 82, the computer 20 checks whether a static phase is signaled by the module 36. For example, this is accomplished by virtue of the computer 20 checking that the value of the variable StaticFlag is equal to one. If the variable StaticFlag is equal to one, in a step 84, the computer initializes one or more parameters of the vehicle 2 that, preferably, need to be initialized in a static phase of the vehicle 2. This is accomplished, in step 84, by virtue of the computer executing one or more initialization processes such as, for example, the processes ZVU and/or ZARU.

The method of FIG. 2 is more reliable than known methods. However, it has been able to be observed that under certain very specific conditions a static phase is signaled by the module 36 while the vehicle 2 is not immobile. It has been discovered that this problem occurs when the static phase of the vehicle 2 is very short, that is to say for example less than five seconds. In this case, the value of the indicator $\mu_V$ drops below the threshold $S_{40.1}$ just before the end of the static phase and returns above this threshold only one or two seconds later. In this case, the module 36 detects a static phase while said static phase has already ended. This causes the thresholds of the set 39 to be updated while the vehicle 2 moves off and is not immobile. The thus updated thresholds of the set 39 are then substantially increased. Later, when the quality of the satellite signals is poor, these substantially increased thresholds of the set 39 cause false detections of a static phase of the vehicle when step 62 is executed.

The method of FIG. 3 overcomes this disadvantage.

FIG. 3 shows another method for identifying a static phase of the vehicle 2 that may be implemented by the module 36 of the system 6 instead of the method of FIG. 2. The method of FIG. 3 is identical to the method of FIG. 2, except that:

step 70 is omitted, and steps 74 to 76 are replaced by steps 90, 92, 94, 96, 100, 102, 104 and 106.

Moreover, in step 52, the indicators $\sigma_V$ and $\mu_V$ are calculated from the measurements acquired during a very short sliding window. A very short sliding window is a window whose duration $D_G$ is less than 0.5 second or than 0.3 second. The duration $D_G$ usually remains greater than 0.05 second or than 0.1 second, however. Here, the duration $D_G$ of the sliding window used for calculating the indicators $\mu_V$ and $\alpha_y$ is equal to 0.2 second. The duration of the sliding windows used for calculating the other indicators remains unchanged, for example.

In the context of the method of FIG. 3, the set 40 of conditions is replaced by two different sets 40a and 40w of conditions. More precisely, the set 40a comprises, besides conditions (40.1) and (40.2) mentioned earlier, an additional condition called "condition (40.3)" below. The set 40w comprises, besides conditions (40.1) and (40.2), an additional condition called "condition (40.4)" below. On the other hand, the sets 38, 39 and 41 of conditions are identical to those described with reference to FIG. 2, for example.

Moreover, in this embodiment, the thresholds $S_{40.1}$ and $S_{40.2}$ are not updated and are constant.

Steps 90 and 100 are steps of incrementing the thresholds $S_{40.3}$ and $S_{40.4}$, respectively, that are used in conditions (40.3) and (40.4), respectively. For example, here, in step 90, the threshold $S_{40.3}$ is incremented by implementing the following relationship: $S_{40.3}=(1+F_{40.3}\times D_t)\times S_{40.3\text{-}last}$, where:

$F_{40.3}$ is a predetermined positive constant, and
$S_{40.3\text{-}last}$ is the value of the threshold $S_{40.3}$ obtained at the end of the previous execution of a step 96 described later on.

In a similar manner, in step 100, the threshold $S_{40.4}$ is incremented by implementing the following relationship: $S_{40.4}=(1+F_{40.4}\times D_t)\times S_{40.4\text{-}last}$, where:

$F_{40.4}$ is a predetermined positive constant, and
$S_{40.4\text{-}last}$ is the value of the threshold $S_{40.4}$ obtained at the end of the previous execution of a step 106 described later on.

The constants $F_{40.3}$ and $F_{40.4}$ are very small. For example, they are equal to the constants $F_{40.1}$ and $F_{40.2}$ described earlier.

Steps 92 and 102 are steps of checking whether conditions (40.3) and (40.4), respectively, are satisfied. In this embodiment, condition (40.3) is as follows: $\mu_a(k)<S_{40.3}$. Condition (40.4) is the following condition: $\mu_w(k)<S_{40.4}$.

If condition (40.3) is satisfied, step 94 of calibrating the threshold $S_{39.1}$ and step 96 of decrementing the threshold $S_{40.3}$ are executed. Otherwise, these steps 94 and 96 are not executed.

If condition (40.4) is satisfied, step 104 of calibrating the thresholds $S_{39.2}$ and $S_{39.3}$ and step 106 of decrementing the threshold $S_{40.4}$ are executed. Otherwise, these steps 104 and 106 are not executed.

In steps 94 and 104, the thresholds $S_{39.1}$, $S_{39.2}$ and $S_{39.3}$ are calibrated on the basis of the values $\sigma_a(k)$, $\sigma_w(k)$ and $\mu_w(k)$, respectively. For example, here, in step 94, the threshold $S_{39.1}$ is updated as described in the case of step 74. On the other hand, in step 94, the thresholds $S_{39.2}$ and $S_{39.4}$ are not modified.

In a similar manner, in step 104, the thresholds $S_{39.2}$ and $S_{39.3}$ are updated as described in the case of step 74. On the other hand, in step 104, the threshold $S_{39.1}$ is not modified.

In step 96, the threshold $S_{40.3}$ is decremented. Here, it is decremented using the same strategy as that used for decrementing the thresholds $S_{40.1}$ and $S_{40.2}$ when step 76 was executed. Thus, when step 96 is executed, the threshold $S_{40.3}$ is decremented by implementing the following relationship: $S_{40.3}=\mu_a(k)$.

Step 106 is identical to step 96 except that it is the threshold $S_{40.4}$ that is decremented. This is accomplished by virtue of the following relationship being implemented: $S_{40.4}=\mu_w(k)$.

In this embodiment, the calibration of the threshold $S_{39.1}$ is executed only if the set 40a is satisfied, and this regardless of whether or not the set 40w is satisfied. In a similar manner, the calibration of the thresholds $S_{39.2}$ and $S_{39.3}$ is executed only if the set 40w is satisfied, and this regardless of whether or not the set 40a is satisfied. Thus, in this embodiment, the calibration of the threshold $S_{39.1}$ and the calibration of the thresholds $S_{39.2}$, $S_{39.3}$ are triggered independently of one another.

It has been observed that using conditions (40.3) and (40.4) makes it possible to avoid triggering an update of the thresholds of the set 39 even after a very short static phase of the vehicle. Thus, this method limits the disadvantage likely to be encountered with the method of FIG. 2.

Chapter II: Variants

Variants of the Sets of Conditions:

The set 38 of conditions can comprise other conditions besides or instead of the conditions described earlier. Examples of other conditions are as follows:

condition (38.3): the signal-to-noise ratio of the satellite signals received is higher than a threshold $S_{38.3}$, condition (38.4): the position of the vehicle 2 is situated inside a predetermined area of a map in which the satellite signals received are of good quality.

To implement condition (38.4), the module 36 comprises a map of the earth's surface identifying areas in which the reception of satellite signals is of good quality.

For example, this map comprises areas that exclude tunnels. This is because when the vehicle 2 is inside a tunnel, reception of satellite signals is poor. To know whether the vehicle 2 is inside one of these areas, the module 36 uses the position of the vehicle 2 determined by the module 26.

The set 39 of conditions can comprise other conditions, besides or instead of the conditions described earlier. For example, another possible condition is the following condition:

$$\mu_a(k)<S_{39.4}, \quad \text{condition (39.4):}$$

where $\mu_a(k)$ is the value, at the instant k, of the indicator $\mu_a$ representing the average of the acceleration of the vehicle 2 measured by the accelerometer 14 and compensated in order to eliminate the acceleration due to the earth's gravity from this measurement. This is accomplished by virtue of the earth's gravity at the location of the vehicle 2 being obtained for example from the position of the vehicle 2 and a mapping or a model of the earth's gravity that allows every possible position of the vehicle 2 to have the earth's gravity acting at this location associated with it.

Another example of a possible condition for the set 39 is as follows:

condition (39.5): $\sigma_B(k)<S_{39.5}$, where $\sigma_B(k)$ is the value, at the instant k, of the indicator $\sigma_B$ representing the standard deviation of the measurements of the magnetometer 30.

The set 40 of conditions can itself also be modified. For example, as a variant, condition (40.1) or condition (40.2) is omitted.

Conditions (40.1) and (40.2) of the sets 40a and 40w can be omitted in the embodiment of FIG. 3. In this case, step 72 is also omitted.

The set 41 of conditions can comprise additional conditions besides condition (41.1) or (41.2). For example, the set 41 can additionally comprise one or more of the following conditions:

$$\sigma_a(k)<S_{41.3}, \qquad \text{condition (41.3):}$$

$$\sigma_w(k)<S_{41.4}, \qquad \text{condition (41.4):}$$

$$\mu_w(k)<S_{41.5}, \qquad \text{condition (41.5):}$$

$$\sigma_B(k)<S_{41.6}, \qquad \text{condition (41.6):}$$

where $S_{41.3}$ to $S_{41.6}$ are constant predetermined thresholds, for example.

Condition (41.1) of the set 41 can be omitted.

In another variant, a set of conditions is considered to be satisfied as soon as at least one of the conditions of this set of conditions is satisfied.

Variants of the Method:

As a variant, step 70 or steps 90 and 100 are executed only during the static phases in order to increase the thresholds that trigger the calibration step. For example, these steps 70, 90 or 100 are executed only if the variable StaticFlag is equal to one.

As a variant, incrementing the thresholds when steps 70, 90 or 100 are executed is performed differently. For example, as soon as an absence of a static phase is signaled, these thresholds are incremented once at a predetermined pace that is independent of the time $D_I$ elapsed since the calibration step was last executed. Then, these thresholds remain constant until the end of execution of a subsequent calibration step.

In another embodiment, steps 70, 90 and 100 of incrementing the thresholds of the set 40 are omitted. In this case, the thresholds of the set 40 are not incremented.

In steps 74, 94 and 104, other relationships can be used in order to update the thresholds of the set 39 on the basis of the measured characteristics of the noise on the measurements of the accelerometer, the gyrometer and the magnetometer. For example, the relationship $S_{39.1}=\sigma_a(k)\times F_{39.1}$ can be replaced by the following relationship $S_{39.1}=\sigma_a(k)+F_{39.1}$. This example can be transposed without difficulty to the other relationships used for updating the thresholds of the set 39.

In a simplified embodiment, steps 74, 94 and/or 104 of calibrating the thresholds of the set 39 are omitted. In this case, for example, these thresholds are constants. In this case, steps 70, 72, 76, 90, 92, 96, 100, 102 and 106 are omitted. In another possible variant, only a portion of the thresholds of the set 39 are calibrated. In the latter case, the other portion of these thresholds is, for example, constant. For example, only one of steps 94 and 104 is omitted. [moo]

Steps 76, 96 and 106 of decrementing the thresholds of the sets 40, 40a and 40w can be performed differently. For example, as a variant, each time the calibration step is executed, these thresholds are decremented at a constant pace that is independent of the values $I_G(k)$. As illustrated in the case of the method of FIG. 3, only a portion of the thresholds of the sets 40a and 40w can be decremented, whereas the thresholds of the other portion are constant.

In a simplified variant, steps 76, 96 or 106 are omitted. Thus, in this variant, the thresholds of the sets 40, 40a and 40w are not decremented after execution of the calibration step.

In step 84, other initialization processes can be executed, besides or instead of the processes ZVU and ZARU. In particular, the initialization process executed in step 84 can be a process for initializing different parameters of the vehicle 2 than those used by the system 6. For example, the information according to which the vehicle 2 is static can be used by a different computer of the vehicle 2 than the computer 20 in order to trigger the initialization of parameters of different sensors than the parameters of the sensors of the system 6.

Other Variants:

Whatever the physical quantity G, other indicators $I_G$, other than an average or a standard deviation, are possible. For example, an indicator $I_G$ representing the measurement of the physical quantity G is the maximum instantaneous value observed during the sliding window W. Thus, as a variant, the indicator $\mu_V$ is replaced by an indicator $Max_v$ that is equal to the maximum instantaneous velocity observed during the sliding window W.

The indicator $I_G$ can also be an instantaneous value of the measurement of the physical quantity G.

In another embodiment, instead of directly using the standard deviation as information representing the standard deviation, it is the variance of the measurements of the physical quantity G that is used. The value of an indicator $\alpha_G$ representing the standard deviation of the measurements of the physical quantity G can also be calculated using the following relationship:

$$\sigma_G(k) = \sum_{i=k-N}^{i=k} |G(i) - G(i-1)|$$

where:

N is a whole number greater than or equal to two and, preferably, greater than or equal to five or ten or twenty, and G(i) is the measured value of the physical quantity G at the instant i.

Other methods are possible for comparing an indicator $I_G$, appearing in the form of a vector, with a predetermined threshold $S_G$. Thus, according to another method, it is a norm of this vector, for example the Euclidean norm, that is compared with the threshold $S_G$.

The system 6 described here can be used in other vehicles such as vehicles capable of moving on the sea or in the air. Thus, the vehicle can also be a train, a boat, a submarine or an airplane. In a general manner, "vehicle" here denotes any object likely to move that is equipped with a system 6 fixed to this object in order to determine its position and its orientation. For example, the vehicle can be a missile, a rocket, a smartphone, a portable computer or the like.

The system 6 can comprise additional sensors for improving even further the precision with which the position and orientation of the vehicle are determined. For example, the system 6 can comprise:
- a pressure sensor in order to improve the determination of the altitude of the vehicle, and/or
- an odometer, such as a pedometer, which measures the distance travelled by the vehicle 2 between two successive instants.

Additional indicators $I_G$ calculated from the measurements of these additional sensors can then be used under conditions from one or more of the sets of conditions 38 to 41.

Numerous embodiments of the module 26 are possible. For example, other possible examples of architecture for the module 26 are described in chapter 4 of Godha2006.

Chapter III: Advantages of the Described Embodiments

When the quality of the satellite signals received is good, using the measurements of the unit 10 in order to detect a static phase of the vehicle allows this static phase to be detected more reliably than if only the measurements of the unit 12 were used. This is because, unlike all the other sensors, the unit 10 measures the velocity of the vehicle directly so that a zero or very low value of the velocity measured by the unit 10 unambiguously identifies a static phase. Conversely, a zero or very low value of the quantity G measured by the other sensors does not necessarily mean that the vehicle is immobile. For example, zero values for acceleration and angular velocity can arise while the vehicle is moving in a straight line at constant velocity. Equally, a constant magnetic field can be observed while the vehicle is moving. Moreover, usually, the standard deviation for the measurements of the unit 10, when the quality of the satellite signals is good, is lower than the standard deviation for the measurements of other sensors such as an accelerometer, a gyrometer or a magnetometer. Thus, during the time intervals in which the quality of the satellite signals is good, use of the measurements of the unit 10 allows the static phases to be detected more reliably than in the case of known methods such as that disclosed in the application U.S. Pat. No. 5,991,692A.

Calibrating the thresholds of the set 39 during a static phase detected from the measurements of the unit 10 allows these thresholds to be controlled more precisely. This is because this static phase has been detected from the measurements of the unit 10, which allow the immobility of the vehicle 2 to be detected very reliably. The risk of calibrating the thresholds of the set 39 while the vehicle 2 is moving is therefore reduced. Moreover, such calibration of these thresholds of the set 39 while the vehicle 2 is immobile allows them to be controlled while taking account of notably the vibrations of the vehicle at a standstill, and therefore allows more precise control of these thresholds to be obtained. More precise control of these thresholds then results in more reliable detection of the static phases when the quality of the satellite signals received is poor.

Decrementing the thresholds of the set 40 over the course of the detected static phase allows the number of times the calibration step is executed to be limited. This also allows the thresholds of the set 40 to be converged on minimum values and therefore the calibration step to be triggered at the moment at which the situation is most favorable for performing calibration of the thresholds of the set 39. Then, the thresholds of the set 39 that have thus been calibrated are no longer modified so long as an even more favorable situation does not arise. This allows the calibration of the thresholds of the set 39 to be improved and therefore the reliability of the method for identifying static phases to be increased.

Triggering the calibration of the thresholds of the set 39 only when the velocity of the vehicle 2 is lower than a predetermined threshold allows the risk of the calibration step being executed while the vehicle 2 is moving to be minimized even further. This therefore increases the reliability of the method for identifying static phases.

Using, in order to trigger the calibration step, a condition for the measurement or the standard deviation of the measurements of the accelerometer or the gyrometer or the magnetometer allows the risk of a calibration step being executed outside a static phase of the vehicle to be limited.

Incrementing the thresholds of the set 40 in the absence of a static phase of the vehicle 2 allows the step of calibrating the thresholds of the set 39 to be triggered more frequently. This therefore allows automatic adaptation of these thresholds to the current situation in which the vehicle moves about.

Using the indicator $\sigma_V$ obtained from the measurements of the unit 10 allows simple and effective detection of the quality of the satellite signals received by the unit 10.

Using an indicator representing the standard deviation of the acceleration of the vehicle 2, the angular velocity of the vehicle 2 or the magnetic field measured by the magnetometer allows effective detection of a static phase even when the satellite signals received are of poor quality.

The invention claimed is:

1. A method for identifying a static phase of a vehicle wherein the vehicle is immobile in a reference frame integral with the earth, said method involving:
   executing a first step of detecting the static phase without using measurements of a satellite geolocation unit, said first detection step involving:
      checking that a first set of one or more conditions is satisfied, said first set of conditions comprising at least one condition relating to measurements taken by an inertial measurement unit aboard the vehicle or by a magnetometer aboard the vehicle and,
      when the first set of conditions is satisfied, triggering the signaling of a static phase and,
      otherwise, when the first set of conditions is not satisfied, triggering the signaling of the absence of a static phase,
   checking, repeatedly, that a second set of one or more conditions is satisfied, the quality of the satellite signals received by the geolocation unit being considered good only when said second set of conditions is satisfied, then
   executing a second step of detecting the static phase from measurements of the satellite geolocation unit, said second detecting step involving checking that a third set of one or more conditions is satisfied, and, when the third set of conditions is satisfied, triggering the signaling of a static phase and, otherwise, when the third set of conditions is not satisfied, triggering the signaling of the absence of a static phase, said third set of conditions comprising the following condition: $I_V(k) < S_{vs}$, where:
      $I_V(k)$ is the value, at an instant k, of an indicator representing the velocity of the vehicle as measured by the satellite geolocation unit, and
      $S_{vs}$ is a predetermined threshold, and
   wherein:

so long as the second set of conditions is satisfied, the method involves only executing the second step of detecting the static phase without executing the first step of detecting the static phase, and so long as the second set of conditions is not satisfied, the method involves only executing the first detection step without executing the second detection step.

2. The method as claimed in claim 1, wherein:

the first set of conditions comprises the following condition: $I_{G1}(k) < S_{IG1}$, where $I_{G1}(k)$ is the value, at an instant k, of an indicator $I_{GL}$ representing a measurement of a first physical quantity G1 or a standard deviation for the measurement of said first physical quantity G1, the first physical quantity G1 being chosen from the group consisting of the acceleration of the vehicle as measured by an accelerometer of the inertial measurement unit, the angular velocity of the vehicle as measured by a gyrometer of the inertial measurement unit, and the earth's magnetic field measured by the magnetometer, and $S_{IG1}$ is a predetermined threshold, during a static phase detected by the execution of the second detection step, the method involves executing a step of calibrating the threshold $S_{IG1}$, said calibration step involving updating the threshold $S_{IG1}$ on the basis of the value $I_{G1}(k)$ of the indicator $I_{G1}$ at an instant k situated within said detected static phase.

3. The method as claimed in claim 2, wherein, during a static phase detected by the execution of the second detection step, the method involves:

checking that a fourth set of one or more conditions is satisfied, and, when the fourth set of conditions is satisfied, triggering the execution of the calibration step and, otherwise, when the fourth set of conditions is not satisfied, the triggering of the calibration step is inhibited, said fourth set of conditions comprising at least the following condition: $I_{G4}(k) < S_{IG4}$, where:

$I_{G4}(k)$ is the value, at the instant k, of an indicator $I_{G4}$ representing a measurement of a second physical quantity G4 or the standard deviation for the measurement of said second physical quantity G4, the second physical quantity G4 being chosen from the group consisting of the acceleration of the vehicle as measured by the accelerometer of the inertial measurement unit, the angular velocity of the vehicle as measured by the gyrometer of the inertial measurement unit, and the velocity of the vehicle as obtained from the measurements of the geolocation unit, and $S_{IG4}$ is a predetermined threshold.

4. The method as claimed in claim 3, wherein, after the triggering of the execution of the calibration step, the threshold $S_{IG4}$ is decremented.

5. The method as claimed in claim 4, wherein the threshold $S_{IG4}$ is decremented by implementing the following relationship $S_{IG4-last}$, where $I_{G4-last}$ is the value of the indicator $I_{G4}$ that has been compared with the threshold $S_{IG4}$ in order to trigger said calibration step.

6. The method as claimed in claim 3, wherein the indicator $I_{G4}$ is an indicator representing the measurement of the velocity of the vehicle by the satellite geolocation unit and the threshold $S_{IG4}$ is less than or equal to the threshold $S_{vs}$.

7. The method as claimed in claim 2, wherein the indicators $I_{G1}$ and $I_{G4}$ both represent the measurement or the standard deviation for the measurement of the same physical quantity.

8. The method as claimed in claim 3, wherein, after the signaling of the absence of a static phase and before the execution of the next calibration step, the threshold $S_{IG4}$ is incremented.

9. The method as claimed in claim 1, wherein the second set of conditions comprises the following condition: $\sigma_v(k) < S_{38.1}$, where $\sigma_v(k)$ is the value, at the instant k, of an indicator $\sigma_v$ representing the standard deviation for the velocity of the vehicle as measured by the satellite geolocation unit, and $S_{38}$ is a predetermined threshold.

10. The method as claimed in claim 2, wherein the indicator $I_{G1}$ is an indicator representing the standard deviation for the measurement of the first physical quantity G1.

11. A non-transitory information recording medium, readable by a microprocessor, wherein said medium comprises instructions for performing a method as claimed in claim 1, when these instructions are executed by the microprocessor.

12. A module for identifying a static phase of a vehicle wherein the vehicle is immobile in a reference frame linked to the earth, said module being configured to:

execute a first step of detecting the static phase without using measurements of a satellite geolocation unit, said first detection step involving:

checking that a first set of one or more conditions is satisfied, said first set of conditions comprising at least one condition relating to measurements taken by an inertial measurement unit aboard the vehicle or by a magnetometer aboard the vehicle and, when the first set of conditions is satisfied, triggering the signaling of a static phase and, otherwise, when the first set of conditions is not satisfied, triggering the signaling of the absence of a static phase, check, repeatedly, that a second set of one or more conditions is satisfied, the quality of the satellite signals received by the geolocation unit being considered good only when said second set of conditions is satisfied, then execute a second step of detecting the static phase from the measurements of the satellite geolocation unit, said second detection step involving checking that a third set of one or more conditions is satisfied, and, when the third set of conditions is satisfied, triggering the signaling of a static phase and, otherwise, when the third set of conditions is not satisfied, triggering the signaling of the absence of a static phase, said third set of conditions comprising the following condition: $I_V(k) < S_{vs}$, where:

$I_V(k)$ is the value, at an instant k, of an indicator representing the velocity of the vehicle as measured by the satellite geolocation unit, and $S_{vs}$ is a predetermined threshold, and wherein the detection module is configured to:

so long as the second set of conditions is satisfied, execute the second step of detecting the static phase without executing the first step of detecting the static phase, and so long as the second set of conditions is not satisfied, execute the first detection step without executing the second detection step.

13. A locating system, capable of being fixed to a vehicle, for determining the position and orientation of said vehicle, said locating system comprising:

a satellite geolocation unit, an inertial measurement unit containing an accelerometer and a gyrometer, wherein it comprises a detection module as claimed in claim 12.

\* \* \* \* \*